United States Patent Office 2,924,315
Patented Feb. 9, 1960

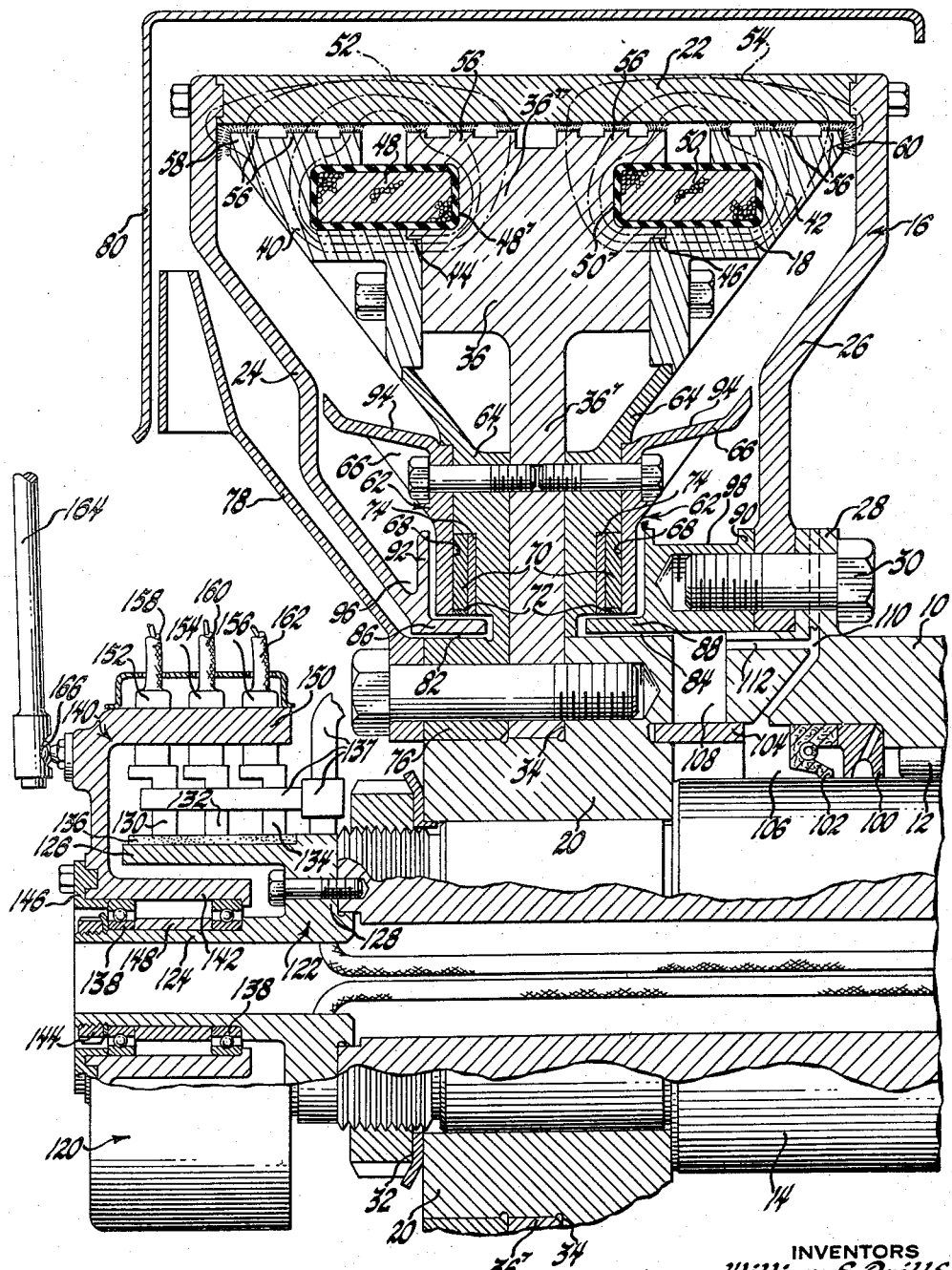

2,924,315

MAGNETIC PARTICLE COUPLING

William E. Brill, Indianapolis, Ind., and Arthur F. Grant, Cleveland, Ohio, assignors to General Motors Corporation, Detroit, Mich., a corporation of Delaware Application June 26, 1956, Serial No. 593,965

2 Claims. (Cl. 192—21.5)

This invention relates to magnetic coupling devices and, more particularly, to magnetic couplings of the type employing a quantity of magnetic particles which under the influence of a magnetic field acts to transmit forces between two otherwise independently movable and relatively spaced members.

Magnetic coupling devices of this type are well known and include clutches and brakes generally formed from a pair of relatively rotatable magnetic members defining an annular gap therebetween and including means for establishing a controllable magnetic field bridging the gap between the members which effects a torque transmitting bond between the magnetic members and the discrete magnetic particles. The magnetic particles utilized in such coupling devices may be either in their dry powder form or mixed with either dry or wet lubricants, but wet or dry, the magnetic particles mixture is preferably limited in volumetric quantity to an amount slightly less than, equal to, or slightly more than the volume of magnetic gap between the members. By thus limiting the quantity of particles, frictional drag is reduced or eliminated between the members and particles when the coupling is deenergized. In addition to the power loss resulting from such frictional drag, the use of an excessive quantity of particles may result in destructive abrading of the coupling members and particles, and in extreme cases may even result in sintering of the particle mixture and in clutch seizures.

It has been found where the annular gap is disk-shaped extending axially between the rotatable members that the centrifugal action on the particles results in considerable packing of the magnetic particles at other than relatively low rotational speeds. This packing tendency of the particles increases as they are reduced in size and tends to retard, and in some cases prevents the proper disengagement of the members. In addition, this packing often results in the application of undesirable axial thrusts against the bearings supporting the rotatable elements of the coupling and associated mechanisms. Consequently, it is generally desirable in such couplings to have the rotatable members define cylindrical or radial gaps.

This invention contemplates among its principal objects to provide such a magnetic particle coupling device with an improved air gap arrangement; to provide such a coupling with rotatable members of coacting configurations effecting an improved magnetic circuit bridging the magnetic gap therebetween; and to provide such a coupling with rotatable members, each comprising a plurality of elements cooperating in assembly to facilitate the manufacture, inspection and maintenance of the coupling.

In an illustrative embodiment of the invention, the foregoing objects are attained by providing such a coupling with an armature assembly including two axially-spaced annular pole members of identical configuration. These two pole members are secured to the opposite end faces of an intermediate or central annular pole member. The intermediate pole member is symmetrical about a plane normal to its axis of rotation and has an outer pole portion of relatively heavy section and a web or spider portion extending radially inwardly from its outer pole portion. The web portion is mounted adjacent its inner periphery to a hub secured to a rotatably mounted shaft. The adjacent faces of the several pole members are recessed to define two annular outwardly facing pockets mounting two oppositely-wound annular field coil windings therebetween. The outer peripheral portions of the pole members are axially separated to establish two outer annular magnetic poles of the same polarity and a single intermediate pole of the opposite polarity.

The web portion of the intermediate pole member in addition to its load carrying function also serves to carry elements of two identical magnetic particle seal assemblies of the type shown and described in United States patent application Serial No. 593,887; filed June 26, 1956, in the name of Arthur F. Grant and entitled "Magnetic Particle Seal."

The armature assembly is spacedly embraced by an inductor drum assembly comprising a cylindrical member and two end plates. The end plates are secured adjacent their outer peripheries to the opposite ends of the cylindrical member, and extending radially inwardly of the coupling, terminate in surface portions coacting with the elements of the magnetic seal and the armature hub to effectively seal the magnetic particles within the coupling. One of the end plates serves as a load carrying member and is secured adjacent its central portion to a second rotatable shaft.

In accordance with the invention, the configurations of the inductor drum and armature assemblies are such as to provide improved magnetic circuits and to define a plurality of primary radial gaps of substantially cylindrical form flanked by two secondary axially-extending gaps of relatively limited radial depth.

The foregoing and other objects, features and advantages of the invention will be more thoroughly understood from the following description having reference to the single figure of the accompanying drawing which shows an illustrative embodiment thereof with portions thereof broken away and in section.

Referring now more particularly to the drawing for more specific details of the invention, a hollow shaft, the end of which is shown at 10, is adapted to be rotatably mounted in a supporting structure, not shown. The shaft 10 carries a plurality of axially spaced bearings 12, only one of which is shown, which journal a second shaft 14, the end of which projects beyond the end of the shaft 10. A magnetic particle coupling constructed in accordance with the invention is adapted to drivingly interconnect the ends of the shaft 10 and 14 and includes an inductor drum assembly 16 which is secured to the end of the shaft 10 and spacedly embraces an armature or electromagnetic field pole assembly 18 which is secured to a hub 20 mounted on the end of the shaft 14.

The inductor drum assembly includes a cylindrical member 22 of magnetic material which concentrically embraces the outer peripheral surface portions of the field pole assembly 18. The opposite ends of the cylindrical member 18 are secured to two end plates 24 and 26 adjacent their outer peripheries. The end plates 24 and 26 are of stepped configuration extending radially and axially inwardly of the coupling. The plate 26 is secured adjacent its inner periphery to a flange 28 carried by the outer end of the hollow shaft 10 by a plurality of bolts 30. The two end plates 24 and 26 are preferably of magnetic material.

The armature or electromagnetic field pole assembly 18 of the coupling includes the hub 20 which is preferably of magnetic material. The hub 20 is suitably keyed to the end of the shaft 14 and retained thereon by a locked spanner nut, as shown at 32. The hub is of stepped outer diameter to provide a radially extending shoulder 34 for mounting a web or spider portion 36' of a central or intermediate magnetic pole member 36. The central pole member is symmetrical about a plane normal to the axis of the shaft 14 and has an outer pole portion 36" which serves as a mounting structure for the remainder of the armature assembly. Two annular magnetic pole members 40 and 42 are secured to the opposite end faces of the pole portion 36" of the member 36. It will be noted that the pole members 40 and 42 are interchangeable being of reversible configuration end for end. The mating faces of the several pole members 36, 40 and 42 are provided with coacting cylindrical surfaces as indicated at 44, 46 to provide telescopic self-alignment between the pole members.

The adjacent faces of the several pole members are recessed to define two annular pockets 48' and 50' and to axially separate the outer peripheral portions of the pole members. Two oppositely wound annular field coil windings 48 and 50 are mounted in the annular pockets 48' and 50' and are electrically energizable to establish two substantially toroidal magnetic fields bridging the annular space between the inductor drum and armature assemblies as indicated by the broken lines 52 and 54. These magnetic fields establish the annular pole members 40 and 42 as magnetic poles of the same polarity, and establish the intermediate pole member 36 as a magnetic pole of the opposite polarity.

The outer surface portions of the pole members 36, 40 and 42 are stepped or grooved to provide a plurality of annular lands 56 in spaced, substantially parallel relation to the inner surface of the cylindrical member 50. These lands are of relatively short axial dimension and provide a plurality of cylindrical magnetic air gaps wherein magnetic lines of force extend radially between the inductor drum member 22 and the several pole members. The outwardly disposed ends of the pole members 40 and 42 are each provided outwardly with an annular land 58 and 60, respectively, and extend radially and axially inwardly from these lands away from the stepped configuration of the end plates 24 and 26 to form substantial clearance chambers therebetween. The lands 58 and 60 are normal to the adjacent lands 56 and are in spaced parallel relation to the adjacent surfaces of the end plates 24 and 26, respectively. The lands 58 and 60 are of limited radial dimension and define secondary magnetic air gaps wherein magnetic lines of force extend axially between the pole members 40, 42 and the end plates 24 and 26, respectively, of the inductor drum.

A mixture of magnetic particles is interposed between the inductor drum and armature assemblies. Preferably, this mixture is of a dry particle type, with or without dry lubricant, but may be of a slurry-type having magnetic particles mixed with a prescribed percentage of liquid lubricant. The magnetic particles are of a size conventional for such couplings and the amount of such mixture is preferably limited to an amount equal to or slightly in excess of the amount required to fill the air gaps between the assemblies.

Two identical magnetic seal assemblies 62 of the type shown and described in the above-mentioned patent application Serial No. 593,887, are mounted on opposite sides of the web portion 36' of the intermediate pole member 36 and coact with the inner peripheral portions of the end plates 24 and 26 to prevent the passage of magnetic particles from the chamber defined between the inductor drum and armature assemblies. The elements of each of the magnetic seal assemblies 62 are interchangeable, being reversible end for end.

Each of the magnetic seal assemblies 62 includes two non-magnetic members 64 and 66 which define an annular groove or pocket 68 therebetween opening inwardly of the coupling. Each of the pockets 68 mounts a ring 70 of permanent magnetic material which is magnetized axially so that the end faces thereof form poles of opposite polarity. A non-magnetic ring 72 is mounted inwardly of each of the magnetic rings 70, and an annular pole piece 74 of magnetic material is also mounted in each of the pockets 68 between the housing member 64 and the permanent magnet ring 70. The members 64, 66, 72 and 74 have inner peripheral surfaces which are in axially-aligned and spaced concentric relation either to an adjacent ring 76 of magnetic material carried by the web 36' and the hub 20, or to the outer surface of the hub member 20. This construction forms two annular grooves 82 and 84 opening towards the axial ends of the coupling. The ring 76 serves as a spacer between the web 36' and a radial fan 78 which, in conjunction with a stationary housing 80, is adapted upon rotation of the armature assembly to deliver cooling air over the inductor drum assembly.

A cylindrical sleeve portion 86 is formed on the end plate 24 and projects into the groove 82 in concentric spaced relation to the side walls thereof, and a cylindrical sleeve portion 88 of an annular sealing member 90 carried by the end plate 26 similarly projects into the groove 84. The end plate 24 is also provided with a flange 92 extending radially outwardly of the cylindrical portion 86. The flange 92 has an annular surface thereon which is normal to the cylindrical portion 86 and parallel to an annular surface on the adjacent member 66. The annular member 90 also has an annular surface thereon which is normal to the cylindrical portion 88 and parallel to an annular surface of the adjacent member 66.

This arrangement of the several elements of each of the seals 62 results in the establishment of substantially toroidal magnetic fields bridging the air gaps between the pole piece 74 of each seal and the adjacent cylindrical portions 86 or 88 and between the opposite pole of the permanent magnet ring 70 of each seal and the radially-extending surface of the adjacent flange 92 or of the member 90. These magnetic fields tend to seal the magnetic particles within the coupling. The lines of force emanating from the magnetic pole adjacent each pole piece 74 are concentrated in the radial magnetic gap between the instant pole piece and the adjacent cylindrical portions 86 or 88, and the flux density across these gaps is thus relatively high. However, the lines of force emanating from the opposite pole of each magnetic ring act through a much greater area and through an axial magnetic gap including the adjacent non-magnetic member 66 as well as through the adjacent air gap. Consequently, the fields across the axially-extending air gaps defined by the members 66 and the radially-extending parallel surface portion of the flange 92 or of the member 90 are of relatively low flux density.

The operation of the magnetic seals provides a three stage sealing action. Any magnetic particles tending to pass radially inwardly of the coupling through the seals 62 are first decelerated by the relatively weak magnetic field in the air gap between the member 66 and the adjacent flange 92 or member 90 and are attracted to the surface of the member 66 from which they are centrifuged radially outwardly of the coupling. Any particles moving beyond this first stage sealing action are subjected to a second stage of sealing action provided by the pole pieces 74. The magnetic action of each pole piece 74 tends to maintain a particle sealing annulus of magnetic particles in the gap between it and the adjacent sleeve portion 86 or 88. Should any particles pass beyond this second stage of magnetic sealing action, they are first required to reverse their direction axially of the coupling before they can pass between the concentrically spaced surfaces of the sleeves 86 or 88 and of the ring 76 or hub 20, respectively, and outwardly of the coupling. However, in passing between these surfaces these particles are subjected to a third stage of magnetic sealing action provided by leakage flux between the sleeve portion 86 and the ring 76, or between the sleeve portion 88 and the hub 20.

The first and second stage sealing actions will normally be sufficient to maintain the particles within the coupling; the third stage being provided merely as assurance against any particle leakage. It is contemplated that in certain applications the sleeve portions 86 and 88, the adjacent surfaces of the seals 62, the ring 76 and the hub 20 may be provided with spiral grooves, none shown, whereby relative rotation between the inductor and armature assemblies causes the magnetic particles passing into the sealing spaces between these members to be returned within the coupling by these grooves.

In addition to their functions directly related to the magnetic seals 62, the members 64, 66, 90, and the flange 92 of the end plate 24 are also arranged to provide annular baffles or pockets tending to prevent magnetic particles from passing radially inwardly of the coupling towards the magnetic seals. The outer peripheral portion of each of the members 64 mates with the annular pole member 40 or 42 and serves as a closure preventing magnetic particles from being centrifuged into and trapped in the space between the outer pole and web of the member 36 and the pole members 40 and 42. The outer portion of each member 64 also cooperates with an annular baffle formed by the outer portion of the adjacent member 66 to provide a first annular particle collecting pocket 94 tending to prevent magnetic particles from passing radially inwardly of the coupling towards the magnetic seals. The flange 92 and the member 90 also serve to form similar annular particle collecting pockets 96 and 98, respectively.

Suitable oil seals are provided to seal the lubricant supplied to the bearings for the shaft members 10 and 14 from the magnetic particle coupling. Two of these seals 100 and 102 are shown interposed radially between the shafts 10 and 14. A third sealing member 104 in the form of a short sleeve is carried at one end by the hollow shaft 10, the opposite end riding in an annular groove formed in the hub member 20. The sealing ring 104 divides the annular space intermediate the sealing member 90 and the oil seal 102 into two chambers 106 and 108. The two chambers are preferably vented to atmosphere; the chamber 106 being vented by one or more passages 110 extending substantially radially through the hollow shaft 110; and the chamber 108 being connected to the passage 110 by a passage 112 extending axially of the shaft member 10. By this arrangement, should any oil or particles enter the chambers 106 and 108, respectively, it will be centrifuged radially outwardly through the passage 110, thus preventing oil from contaminating the magnetic particle mixture of the coupling and preventing magnetic particles from reaching the oil seal 102 which would result in the rapid destruction of such a seal.

Either the inductor drum assembly 16 or the field pole armature assembly 18 may constitute the driving input member of the coupling shown in the illustrative embodiment of the invention. However, it is generally preferable that the outer of such assemblies constitute the driving input member since the continuous rotation of such member will tend to centrifuge the dry or wet particle mixture outwardly against its inner surface thus reducing the particle sealing problems inherent in such couplings. However, in certain applications it is desirable that the driving member of the coupling be that member having the larger inertia mass due to the operating characteristics of the prime mover to which the coupling is connected. In such an application it would be preferable that the field pole armature assembly 18 of the illustrative coupling constitute the driving input member; the particles being free to float about within the coupling when the field coils are deenergized.

The field coil windings 48 and 50 are connectable to a source of electrical potential, not shown, through suitable leads and a suitable slip ring and brush contact arrangement 120 to establish a magnetic field bridging the air gaps between the pole members and the inductor drum assembly. The establishment of such a field effects a load transmitting bond between the inductor drum assembly and the pole members of the armature, through the magnetic particles. This bonding action is proportional to the magnetic fields effected by the electrical energization of the field coils 48 and 50 up to a point at which current passing through the coils is sufficient to effectively lock the inductor drum and armature assemblies together by the magnetic bonding action of the magnetic particles.

The slip ring and brush contact construction is preferably of the type shown and described in copending United States Patent No. 2,872,606 issued to William E. Brill and entitled "Slip Ring and Brush Holder Construction for Electrodynamic Machinery." This construction includes a Turk's-head shaped ring carrier member 122 having an inner cylindrical portion 124 and an outer cylindrical portion 126 joined by a radially-extending base portion 128 which is secured to the end of the shaft 14. The outer portion of the member mounts axially-spaced slip rings 130, 132 and 134 which are insulated therefrom by an insulator pad 136 and which are connected to the field coils 48 and 50 by suitable connections indicated at 137. The cylindrical portion 124 mounts two anti-friction bearings 138 which, in turn, rotatably mount a second Turk's-head shaped brush carrier member 140 which telescopically embraces the outer cylindrical portion 126 of the member 122 and the slip rings 130, 132, and 134. The bearings 138 are retained between the portion 124 and an inner cylindrical portion 142 of the member 140 by a spanner nut 144 and a retaining collar 146 and are axially separated by spacer sleeve 148. The outer cylindrical portion 150 of the member 142 mounts three brushes 152, 154, 156 which bear on the outer surface of the slip rings 130, 132 and 134, respectively, and are connected to the source of electrical potential by leads 158, 160 and 162, respectively. The brush carrier member 142 is retained against rotation by a tie rod 164 which is connected thereto by a ball-and-socket connection 166 and is connected at its opposite end to a stationary structure, not shown, by a similar swivel connection, also not shown. This construction mounts the brushes in concentric relation with the slip rings, thus reducing the slip ring and brush wear which is inherent in conventional slip ring and brush mounting constructions where the brushes are carried by the supporting structure.

From the foregoing description it will be seen that the several objects of the present invention are obtained thus providing a magnetic particle coupling of compact and simplified design and of reduced weight having a plurality of relatively simple interchangeable parts and an improved air gap arrangement tending to dampen axial as well as radial vibratory movement occurring between the rotating inductor drum and armature assemblies.

While only one specific structural embodiment of the invention has been shown and described for purposes of illustration, it will be appreciated that various minor modifications may be made without departing from the spirit and scope of the invention, as defined in the following claims.

We claim:

1. A magnetic particle coupling comprising, in combination, a field coil armature assembly rotatably mounted about an axis and including two annular pole members of identical configuration, a third annular pole member symmetrical about a plane normal to said axis, said two pole members being secured to opposite end faces of said third pole member, the adjacent faces of said pole members being recessed to define two annular outwardly facing pockets, said pockets mounting two oppositely wound annular field coil windings adapted to be electrically energized and separating the outer peripheral portions of said pole members to provide two outer annular magnetic poles of the same polarity and a single intermediate pole of opposite polarity; an inductor drum assembly rotatably mounted about said axis in spaced embracing relation to said armature assembly and including a cylindrical member concentrically embracing the outer peripheral surfaces of said pole members and two end plates secured adjacent their outer peripheries to the opposite ends of said cylindrical member and extending radially inwardly of the coupling; the configurations of said pole members and the inductor drum assembly defining a plurality of cylindrical magnetic air gaps wherein the magnetic lines of force extend radially between the pole members and the cylindrical inductor drum member and two secondary magnetic air gaps wherein the magnetic lines of force extend axially from the opposite end surfaces of said two annular pole members to the adjacent end plates, said secondary magnetic gaps being of limited radial depth; sealing means coacting between said armature and inductor drum assemblies to define a magnetic particle receiving chamber therebetween; and magnetic particle material between said members in an amount to substantially fill said cylindrical and secondary magnetic air gaps and to establish a load transmitting bond through said magnetic particles between the surfaces of said members defining said cylindrical and secondary magnetic gaps when said coils are energized thereby producing a magnetic field bridging said gaps.

2. A magnetic particle coupling comprising, in combination, an annular pole member rotatably mounted about an axis, two annular pole members secured to opposite end faces of said first mentioned pole member, the mating faces of said pole members being recessed to define two annular outwardly-facing pockets mounting two oppositely wound annular field coil windings and separating the outer peripheral portions of said pole members to provide two outer annular magnetic poles of the same polarity and a single intermediate pole of opposite polarity upon energization of said windings, an inductor drum assembly rotatably mounted about said axis in spaced embracing relation to said pole members and defining therewith a plurality of cylindrical magnetic air gaps wherein magnetic lines of force extend radially therebetween and two secondary magnetic air gaps flanking said cylindrical gaps and wherein magnetic lines of force extend axially between the extreme end faces of said two annular pole members and the adjacent surfaces of said assembly, said secondary gaps being of limited radial depth; said assembly including a cylindrical member concentrically embracing the outer peripheral surfaces of said pole members and two end plates secured to the ends of said cylindrical member and extending radially inwardly of the coupling, sealing means coacting between said first-mentioned member and said end plates to define a magnetic particle receiving chamber therebetween, and magnetic particle material between said members in an amount to substantially fill said cylindrical and secondary magnetic air gaps and to establish a load transmitting bond through said magnetic particles between the surfaces of said members defining said gaps when a magnetic field is established bridging said gaps upon energization of said windings.

References Cited in the file of this patent
UNITED STATES PATENTS

| | | |
|---|---|---|
| 2,718,946 | Winther | Sept. 27, 1955 |
| 2,725,133 | Winther | Nov. 29, 1955 |
| 2,745,974 | Oetzel | May 15, 1956 |
| 2,756,852 | Findley | July 31, 1956 |
| 2,772,762 | Gamundi et al. | Dec. 4, 1956 |
| 2,791,308 | Barrett et al. | May 7, 1957 |
| 2,794,525 | Winther | June 4, 1957 |